United States Patent [19]
Armstrong et al.

[11] 3,767,892

[45] Oct. 23, 1973

[54] THERMAL BRIDGE FOR MOLDING MACHINE

[75] Inventors: Thaddeus J. Armstrong, Elmwood Park; John Ohlhaver, Deerfield, both of Ill.

[73] Assignee: Continental Can Company, Inc., New York, N.Y.

[22] Filed: July 29, 1971

[21] Appl. No.: 167,285

Related U.S. Application Data

[62] Division of Ser. No. 809,898, March 24, 1969, Pat. No. 3,635,619.

[52] U.S. Cl. .................................. 219/243, 425/125
[51] Int. Cl. .............................................. H05b 1/00
[58] Field of Search.................. 219/243, 251, 201; 93/DIG. 1; 249/59; 338/23, 24; 425/809, 407, 143, 144; 165/26; 156/583; 100/93 P

[56] References Cited
UNITED STATES PATENTS

| | | | |
|---|---|---|---|
| 2,701,926 | 2/1955 | Meyer | 219/243 X |
| 3,624,836 | 11/1971 | Rohdin | 219/243 |
| 3,286,077 | 11/1966 | Radford et al. | 219/251 |

*Primary Examiner*—C. L. Albritton
*Attorney*—Americus Mitchell et al.

[57] ABSTRACT

A thermal bridge for an electrically heated compound molding machine wherein the heat transfer from the molding plug is reflected to a heating assembly through a thermal transfer element or thermal plug. The thermal plug is made of a highly conductive material so that small swings of the die are rapidly reflected to the heating element.

11 Claims, 12 Drawing Figures

PATENTED OCT 23 1973
3,767,892
SHEET 1 OF 5

INVENTORS
THADDEUS J. ARMSTRONG
JON OHLHAVER

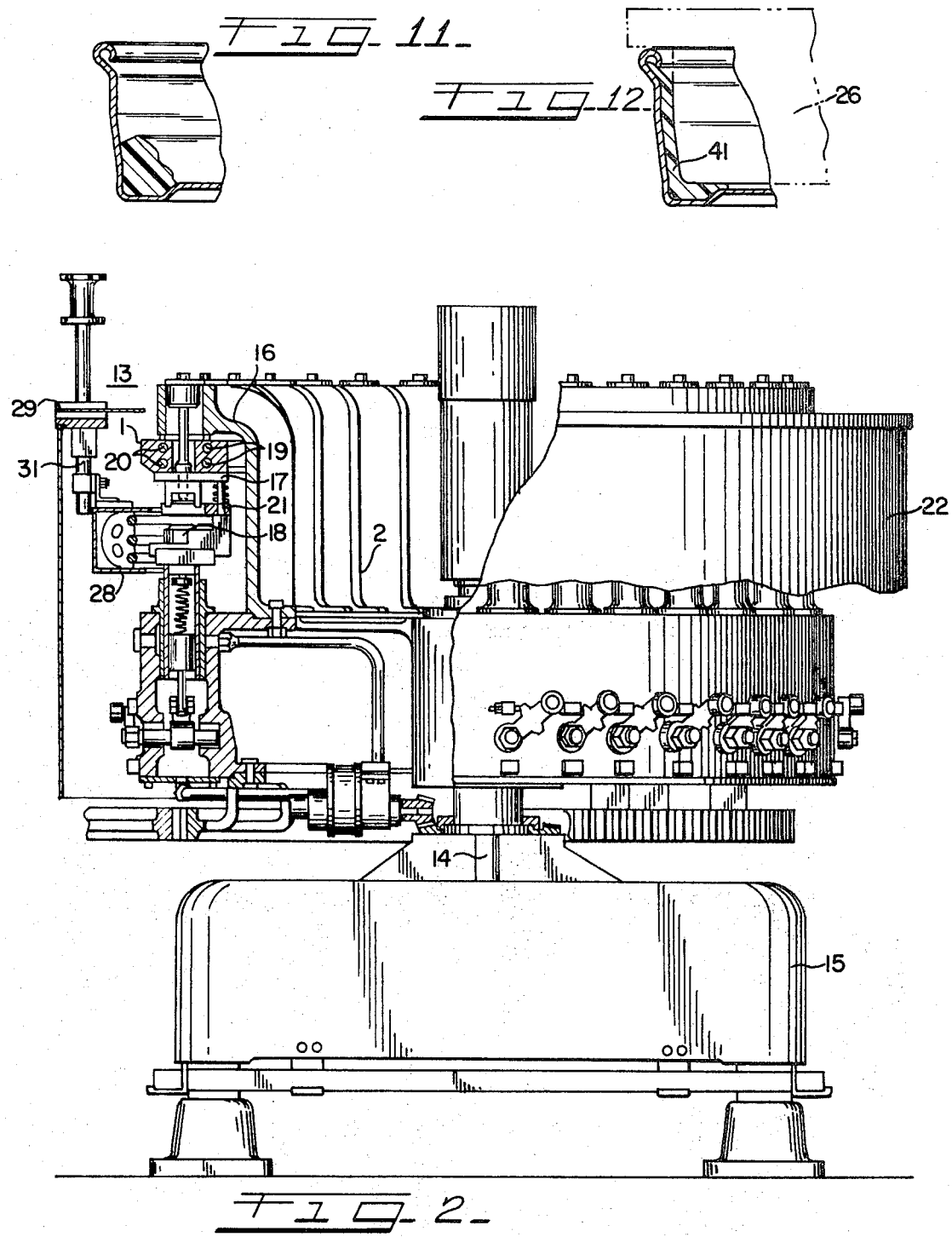

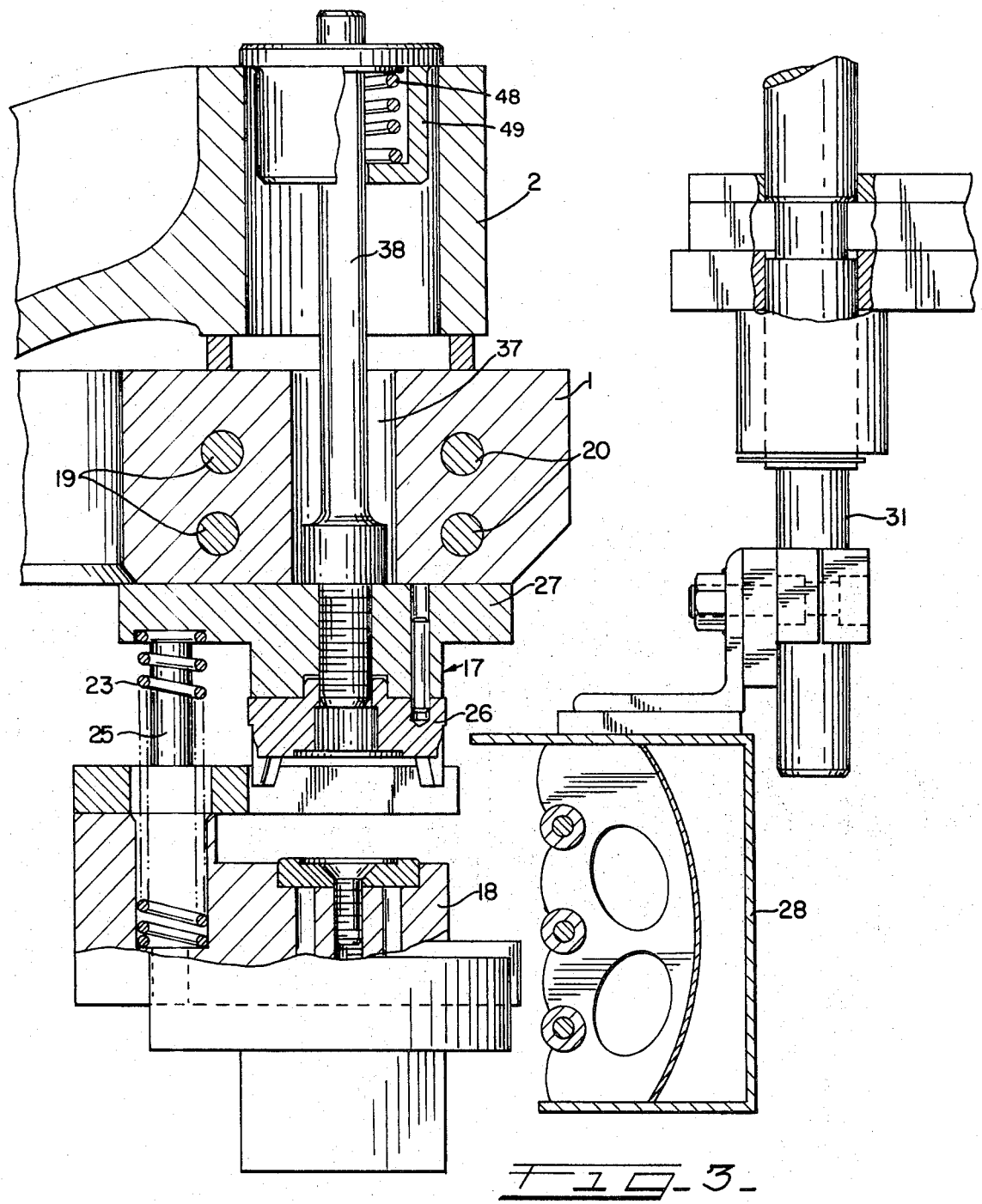

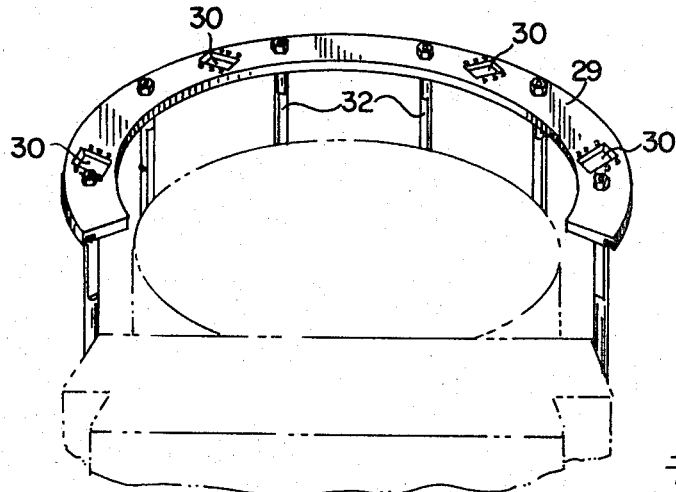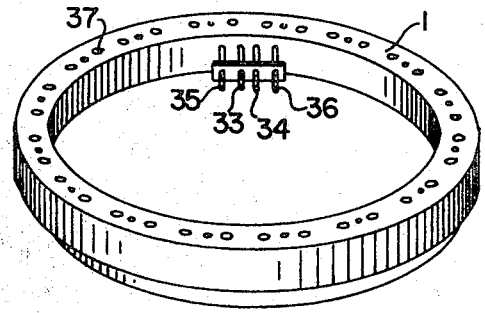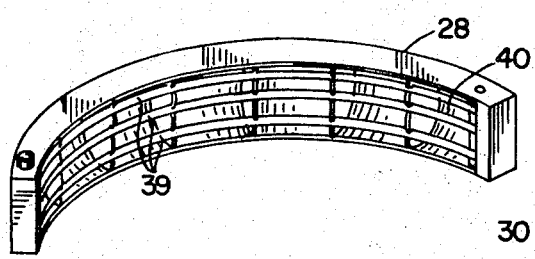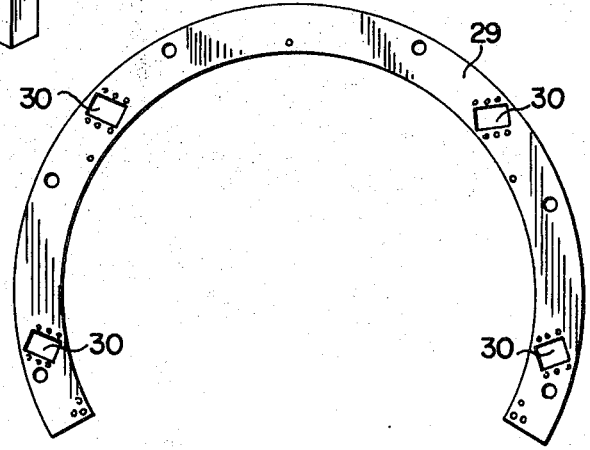

INVENTORS
THADDEUS J. ARMSTRONG
JON OHLHAVER

BY

ATT'Y.

THERMAL BRIDGE FOR MOLDING MACHINE

This case is a divisional application of U.S. Ser. No. 809,898, filed Mar. 24, 1969, now U.S. Pat. No. 3,635,619, in the names of Thaddeus J. Armstrong and Jon Ohlhaver, entitled "Electrically Heated Compound Molding Machine", and assigned to the same assignee as this invention.

This apparatus is essentially an improvement of the apparatus embodied in the patent application entitled "Machine for In-Place Molding of Cap Gaskets", by Norbert L. Wright, U.S. Pat. No. 3,407,442, and assigned to the assignee of the present invention.

This invention relates to the forming or molding of plastic materials, and more particularly, to improvements in a heated molding machine for in-place molding of resin compositions. The improvement is the use of a particular thermal bridge between the heated die member and a heat sensitive control element.

It is a general object of the present invention to simplify and improve the construction and operation of the machine referred to in the above patent.

It is another object of the invention to provide a machine having fewer elements.

It is another object of the invention to provide a machine having a quick start-up time.

It is another object of the invention to provide a machine having excellent heat-transfer characteristics and responsive heat control.

It is a final object of our invention to provide a machine having easier disassembly and access for repair.

These and other objects and advantages of the invention will become apparent from a consideration of the molding machine which is shown by way of illustration in the accompanying drawings and more clearly understood by reference to the following detailed description wherein:

FIG. 2 is a side elevation of our machine with portions broken away.

FIG. 3 is a partial vertical section to an enlarged scale of an upper and lower clamp member taken from the opposite side as FIG. 2.

FIG. 4 shows a part of our machine showing the ring support member.

FIG. 5 shows an upper heater element.

FIG. 6 shows a lower heater element.

FIG. 7 shows a top view of the ring support member.

FIG. 11 shows the fragmentary section to an enlarged scale through the skirt of a cap shell prior to the molding operation.

FIG. 12 is a view similar to FIG. 11 after the molding operation and the plastic is in its final position.

As described in the accompanying figures, this device is, in most essentials, very similar in its operation and structure to the device referred to in the above-mentioned patent to Norbert L. Wright, U.S. Pat. No. 3,407,442.

Figure 1:
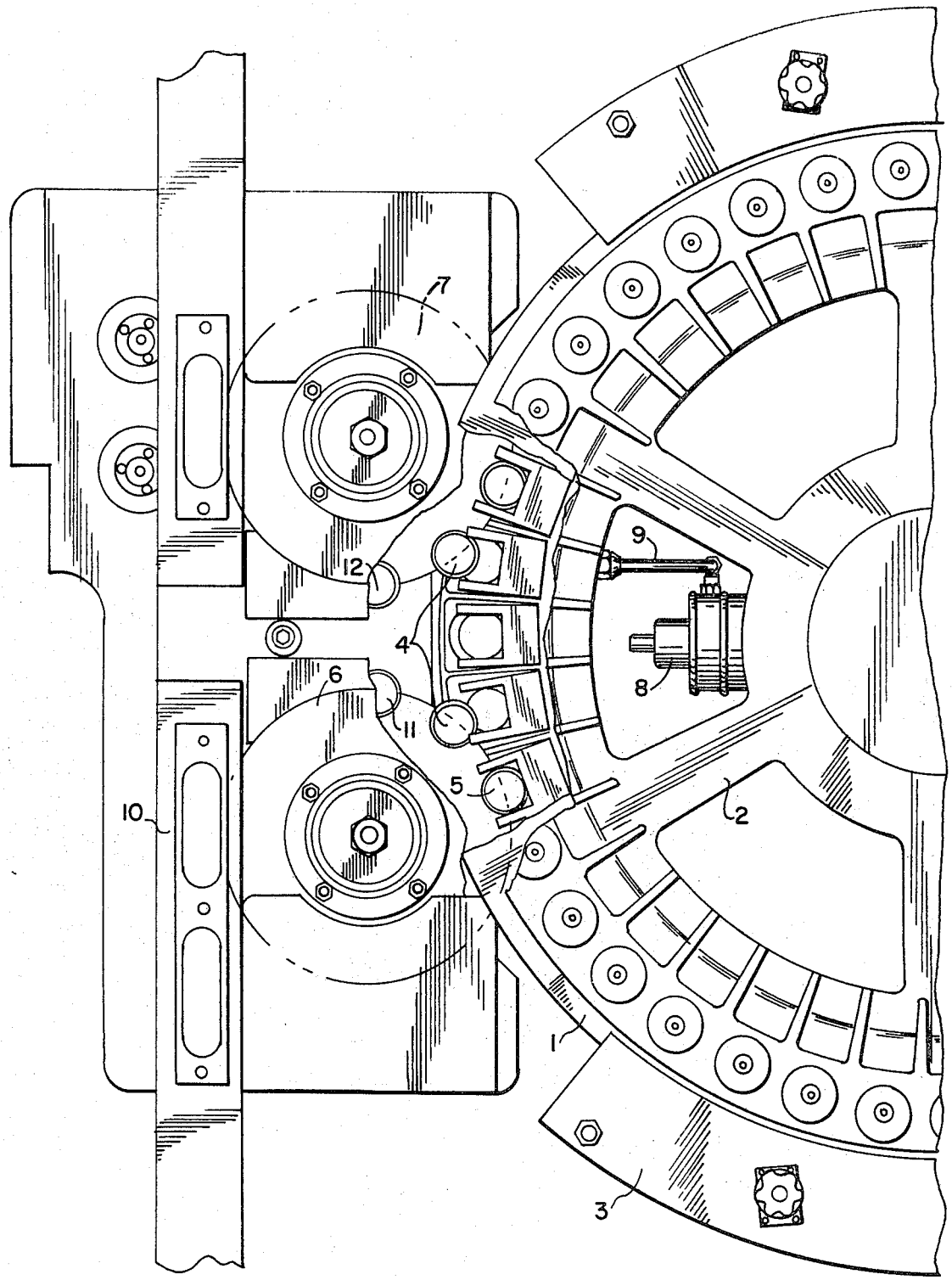
FIG. 1 is a plan view of our machine for molding cap liners having portions of the machine broken away for a clearer view.

FIG. 1 shows the upper heating ring 1 underneath the turret 2. This upper electrical heater ring is attached to the turret and rotates with the turret. An appropriate number of slip rings are mounted on the axis of the turret and cooperating rings. In this way, power is supplied to the electric heater. The cover 3 is shown surrounding about three-fourths of the turret 2 which rotates inside the cover 3. Part of the turret is broken away to show caps 4 being passed into and out of the turret. These caps 4 are fed from a wheel pocket 5 in the wheel turret 6 and after having been processed, are taken away by another wheel turret 7 for further operations. The spindle operating elements of the individual stations of the turret are lubricated by a pump 8 shown interiorly of the turret and oil is conducted through a lubricant supply line 9 to the necessary points on the turret. A belt 10 or similar conveyance brings unprocessed caps 11 to the machine and takes the processed caps 12 from the machine.

A cross-section view of the machine is shown in FIG. 2. A cross-section of one of the stations 13 in side elevation shows most of the moving parts. The turret 2 is rotatably mounted on a shaft 14 which extends from the center of the base machine 15 upwardly. The turret has a shape somewhat similar to a bowl having a lip 16 around its upper rim.

Suspended from the upper lip 16 is shown a cross-section of the upper heater ring 1 which is hung beneath the outer sectoin of the turret. The heater ring 1 extends completely around the turret 2 and the temperature of the heater ring is controlled by the amount of electricity fed into the ring in response to the temperature of the upper molding die 17 and to a lesser extent, the cap and lower clamping place member 18. Two pairs of heater elements 19, 20 extend completely around the ring. These heater elements are connected to an external power source through slip rings. The amount of electricity conducted to and through the electric heater is controlled by thermostat which responds to the level of the temperature in the molding die or punch 21. When the temperature of the thermostat is above a certain level, the thermostat stops the flow of electricity to the upper heater ring 1 and when the temperature of the thermostat is below a certain level, the thermostat starts the flow of electricity to heat the upper heater ring 1 until the thermostat cut-off works as described above.

A thermostat, not shown, regulates the temperature of the lower clamping lifting member to about the same temperature as the punch. This assembly radiates heat to the lower clamp assembly, thereby keeping it at a temperature near the curing point of the plastic being used in the caps.

As shown in the drawing, the entire area may be covered by a shield 22 to protect against flying debris, dust and air currents.

Turning now to a closer view of the upper and lower punch assemblies 17, 18, from a different view, FIG. 3 shows the lower punch assembly 18 and an upper punch assembly 17 having a single compression spring 23 with two paired pins 24, 25 slidable between the punch assemblies 17, 18 to keep proper orientation and distance between the assemblies so that the punch assembly or die punch 26 enters the cap at a proper place to press down the plastic material located around the inside of the cap. The compression spring 23 imparts an upward force to the upper heat transfer element 27.

Above the die or punch 26 is shown the upper thermal transfer element 27 which operates as a heat sink since it is of a much more dense material than the heater ring 1. In this way, as heat is extracted from the die or punch and passed into the ambient atmosphere and the plastic material and the cap material, this heat will momentarily lower the temperature of the die or punch 26 somewhat which acts as a heat-removing means, but whatever heat is lost is quickly restored by the upper thermal transfer element 27 which has a high heat capacity. The rate of heat flow through the upper thermal heat transfer element 27 is relatively slow in comparison to the rate of heat transferred through the heater ring 1. The heater ring is made of a material having a high heat transfer capacity, such as aluminum. In this way, when electric potential is applied to the resistors 19,20 in the heater ring, the temperature of the resistors will rise rapidly and this heat is transmitted to the ring material. The ring is made of a material having a high rate of heat conductivity, such as aluminum. From the heater ring, heat is passed into the upper thermal transfer element.

The upper thermal transfer element 27 is made of a material having the characteristics of high heat capacity per cubic centimeter and a relatively low rate of heat conductivity, for example, steel. Because of these two characteristics, it acts as a heat sink or thermal storage place. The heat sink provides a buffer and a heat-equalizing region so that the heat supplied by the heater ring on one side and the heat flowing out of the punch on the other side do not cause wide swings in the overall temperature of the upper punch assembly. Heat travels about six times as fast in aluminum as in the upper steel heat transfer element.

The lower forming assembly is controlled in about the same manner as the upper assembly in that one or more thermostats are located around its periphery and as the upper turret turns, the lower assembly is heated by heater elements located in the lower heater assembly 28. A thermostat (not shown) located at the lower assembly calls for more or less heat as the situation demands, and keeps the lower assembly within a temperature range of 10° to 15° of about 425° F, depending on the plastic heat curable material used for the gasket.

Shown in FIG. 4 is a plan view of details of the heater support ring 29 found in FIGS. 1 to 3, inclusive. This support ring 29 has diagonal slots 30 in it so that the lower heater supporting elements 31 (FIGS. 2 and 3) are mounted in these diagonal slots 30 and may be moved from a position of about 1/16 inch away from the lower die or punch assembly to several inches away. This slot arrangement facilitates repair work of the turret and lower support structure because when the lower heating ring 28 is moved backward several inches, access to the lower structure is more readily possible. The supporting means 29 is mounted on posts 32. In order to render access to the interior of the machine even more easy, the posts on each side are of a simple snap-in removable type support. When one or two of these supports are removed, the heater support ring is then held up by the other four or five supports shown in the figures. These four rear-most supports are fastened top and bottom so that elimination of any one support is not fatal to the function of the ring.

The upper heating ring 1 is shown in perspective view in FIG. 5. Terminals for conducting electricity into and out of the heater ring 1 are connected so that the two pairs of inner terminals 33,34 connect to the resistors shown to the inside of the ring. The two pairs of outer terminals 35,36 connect to the outer resistors 20. As shown best in FIGS. 3 and 5, the electric terminals conduct electricity into the resistor elements 19,20 cast into the aluminum ring 1. The thermal rate of conductivity of aluminum is quite high. The aluminum heater ring 1 conducts heat from the resistors quite rapidly. Passages 37 shown in the heat ring pass completely through the ring to accomodate the shafts 38 of the molding elements (FIG. 3). The heater elements 19,20 pass inside or outside of the passages 37.

A pair of lower heating elements 28 are mounted about the lower punch assembly 18. One of the two lower heaters 28 is shown in FIG. 6. Several resistor elements 39 conduct electricity and develop heat. Behind the resistor elements are heat reflectors 40 to divert any heat rays forward toward the lower assembly. While the heat radiated by these heater elements 28 is of considerable criticality in the forming of the plastic ring, it is not quite as critical as the amount of heat developed in the heater ring because the upper die or punch is in physical contact with the plastic ring and therefore, the heat imparted to the plastic or plastic disc 41 (FIG. 12) from the upper die or critical punch 26 is of more consequence to its forming.

FIG. 7 shows the support ring 29 itself as it is seen without any fastenings. On the right and left are paired slots 30 for supporting the lower heating semi-circular elements 28 so that these elements can be moved into and out of proximity with the lower heated die assembly 18. When the lower heater is moved forward in the slots, it is about 1/16 inch from the lower die assembly.

Figure 8:
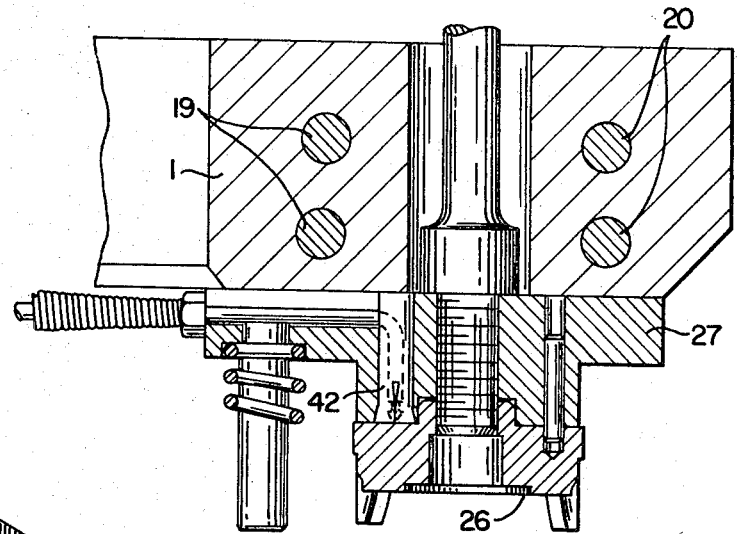
FIG. 8 is a sectional view of an upper clamp member at the thermal control station on the periphery of the turret.
Figure 9:
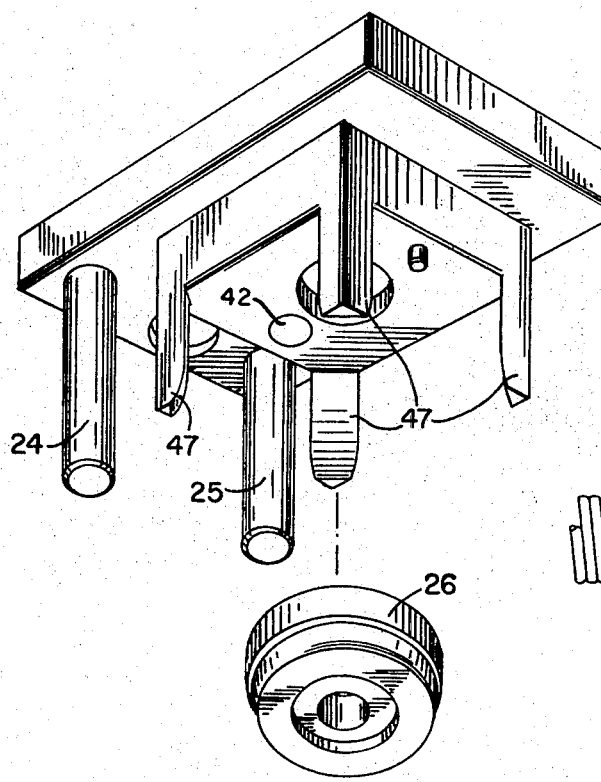
FIG. 9 is an exploded perspective view showing the upper molding die support plug and clamp member.

In an apparatus of this sort, the level of the temperature of the upper and lower dies is critical. If the temperature of the die is too high, the plastic inside the cap will burn and stick to the punch. If, on the other hand, the temperature of the die is not high enough, the plastic material will not flow to form the desired sealing contact all the way around the cap (FIGS. 11 and 12). A temperature range at which the plastic will work satisfactorily is on the order of 410° to 425° F. Some plastic materials may be cured in a broad range of temperatures, such as 300° to 500° F. In the usual factory operating conditions, a variety of influences play upon a machine. For example, it may be summer, winter, raining, high humidity, low humidity, or drafty. Each of these variable atmospheric conditions affects the rate at which heat flows from the machine and thus affects heat distribution through the machine. It is necessary for the heat to be at a very precise level of temperature at the point where the die 26 or punch forms the plastic in the cap. Since the various atmospheric effects play upon each station of the turret with approximately the same result at each station, a very good control can be accomplished by having one thermal control point at a single upper punch assembly 26 on the periphery of the turret 2. Such a thermal control point is established at the station shown in cross-section in FIG. 8. The heater ring 1 with its paired resistance elements is mounted to the top element 42 (FIG. 3) shown and below that and pressed into contact with it is the upper thermal transfer element 27 which forms a heat sink. Shown on the left-hand side of the upper thermal transfer element 27 is a plug 42 extending through the upper thermal transfer element. This plug is made of a material having a high thermal conductivity and acts as a thermal conducting means. A perspective view of the upper thermal transfer element 27, the punch 26, the thermal plug 42, and the locator pins 24,25 is shown in FIG. 9.

Figure 10:
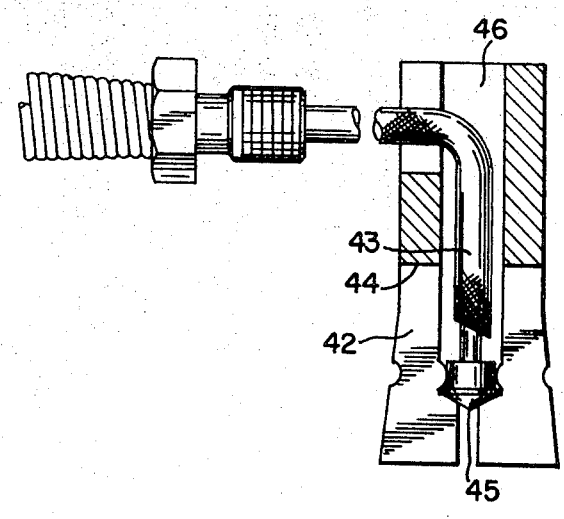
FIG. 10 shows the thermocouple tip and thermocouple support element.

The details of the thermal plug and the thermocouple combination are shown in FIG. 10. The plug 42 is shown before it is driven into the upper element 27 in FIG. 8.

While it is out of the assembly, the thermocouple 45 is pushed down into the plug 42 where it snaps into place. The plug has slits 44 almost half of its length in four perpendicular directions. This facilitates later crimping of the plug when it is forced into the upper thermal transfer element 27. When the thermal plug 43 has been driven into the thermal element, the thermocouple 45 is located fairly close to the die or punch 26. In this way, temperature gains or looses of the die or punch are reflected into the heater ring much more quickly than would be the case if the thermal plug was of a material which conducted heat slowly. The amount of heat added to the heater ring in order to bring the die or punch up to the given temperature is lessened. Thus, heater plug 43 is a thermal connection between the heater ring and the die or punch so that the extent of the temperature swings of the die or punch are considerably lessened by means of the thermally conductive bridge formed by the thermal plug.

The method of forming the thermal plug with included thermocouple is of particular interest. The thermal plug 42 is made of a highly conductive material in the form of a cylindrical plug having a channel 46 through its center. The plug is flat at its ends and is slit 44 up one-third to one-half of the way, the slit being in the form of an "X". Once the thermocouple 45 is inserted into the thermal plug 42, the thermal plug may be pressed together so that the thermocouple element 45 is caught in the bottom of the thermal plug 42. When the thermal plug is shoved up into the thermal transfer element, it makes a tight fit which holds it in place.

The function of the upper heat transfer element 27 is two-fold. It acts as a heat sink and also since it is made of a very strong material, the four locator pins 47 center the cap in a very precise position. If the material were made of other than steel or the like, a locator finger might bend, and this would result in an immediate malfunction of the machine. Further, this element is capable of being smoothed to a high degree and may have high contact pressure with the aluminum heater 1. Because of the density of the material in the heat sink and the slow rate of which heat flows through this material, more heat is accumulated per cubic centimeter in the material of the heat sink than is in the aluminum heater ring. By means of having an intermediate heat sink, greater stability is assured to the temperature of the punch member. Since the heater ring may swing widely in temperature, the "buffer" heat sink protects the punch and consequently, the cap member from the temperature swings of the heater ring and insures a considerably greater stability to the plastic material and the punch which heats it.

While particular materials and specific details of construction have been referred to in describing the form of the machine illustrated, it will be understood that other suitable materials and equivalent structreal details may be resorted so without departing from the spirit of the invention.

What is claimed is:

1. A thermal bridge for critical temperature areas comprising:
    a heater means;
    A heat-removing means;
    a thermal transfer means having a low thermal conductivity and a high thermal capacity compared to both said heater means and said heat-removing means for conducting heat from said heater means to said heat-removing means to provide a thermal barrier and a heat sink between said heater means and said heat-removing means;
    a passageway extending at least part way through said thermal transfer means in the direction of thermal flow through said thermal transfer means from said heating means to said heat-removing means;
    an elongated thermal conducting means having high thermal conductivity compared to said thermal transfer means in said passageway and extending from said heat-removing means toward said heating means; and
    a temperature sensing element mounted inside said elongated thermal conducting means near to said heat-removing means whereby when heat is extracted from said heat-removing means to lower the temperature of said heat-removing means, the temperature of the temperature sensitive element is affected in a short time and the temperature of said heater means may be raised to re-supply heat to sad thermal transfer means and thus to said heat-removing means.

2. A thermal bridge for critical temperature areas as set forth in claim 1 in which said heater means comprises,
    at least one resistance means for imparting heat to the rest of said heating means,
    a highly conductive material surrounding said resistance means and having one surface in intimate contact with said thermal transfer means whereby heat is conducted from said heating means to said thermal transfer means.

3. A thermal bridge for critical temperature areas as set forth in claim 1 in which said heat-removing means comprises,
    a die element for in-place molding of a plastic cap liner.

4. A thermal bridge for critical temperature areas as set forth in claim 1 in which said heat-removing means comprises,
    a punch made of a heat conductive material and shaped for in-place molding of a plastic cap liner.

5. A thermal bridge for critical temperature areas as set forth in claim 1 in which said thermal transfer means comprises,
    at least one plate made of a relatively dense material and adapted for intimate contact on a first side with said heating means and on a second side with said heat-removing means.

6. A thermal bridge for critical temperature areas as set forth in claim 1 in which said elongated thermal conducting means comprises,
    a cylindrical member having a longitudinal axis, a first and second somewhat flared end,
    a first slot in said first flared end and extending along said longitudinal axis about half-way up the length of said cylindrical member, a second slot at right angles to said first slot and extending about half-way along said longitudinal axis of said cylindrical member, a passageway extending along the longitudinal axis of said cylindrical member from said first end to near said second end whereby a temperature sensitive means may be inserted to near said second end.

7. A thermal bridge for critical temperature areas as set forth in claim 6 in which said elongated thermal conducting means further comprises, a slot in said first end to accommodate an electrical lead to said temperature sensitive means.

8. A thermal bridge for critical temperature areas as set forth in claim 7 in which said thermal transfer means further comprises, a channelway in a surface of said thermal transfer means for an electrical lead to said temperature sensitive means.

9. A thermal bridge for critical temperature areas as set forth in claim 1 in which said elongated thermal conducting means comprises, an elongated cylindrical plug fitting snugly into said passageway in said heat transfer means.

10. A thermal bridge for critical temperature areas as set forth in claim 6 in which said cylindrical member comprises:

an elongated element fitting snugly into said passageway in said thermal transfer means.

11. A thermal bridge for critical temperature areas comprising:

a heater means;

a heat-removing means;

a thermal transfer means having a high thermal capacity compared to both said heater means and said heat-removing means for conducting heat from said heater means to said heat-removing means;

a passageway extending at least part way through said thermal transfer means in the direction of thermal flow through said thermal transfer means from said heating means to said heat-removing means;

an elongated thermal conducting means having high thermal conductivity compared to said thermal transfer means fitting snugly in said passageway and extending from said heat-removing means toward said heating means; and a temperature sensing element mounted inside said elongated thermal conducting means near to said heat-removing means whereby when heat is extracted from said heat-removing means to lower the temperature of said heat-removing means, the temperature of the temperature sensitive element is affected in a short time and the temperature of said heater means may be raised to resupply heat to said thermal transfer means and thus to said heat-removing means.

* * * * *